United States Patent
Jiang et al.

(10) Patent No.: US 7,331,499 B2
(45) Date of Patent: *Feb. 19, 2008

(54) MANUFACTURING METHOD FOR A CERAMIC TO METAL SEAL

(75) Inventors: Guangqiang Jiang, Santa Clarita, CA (US); Kate E. Purnell, Valencia, CA (US); Gary D. Schnittgrund, Granada Hills, CA (US)

(73) Assignee: Alfred E. Mann Foundation For Scientific Research, Santa Clarita, CA (US)

( * ) Notice: Subject to any disclaimer, the term of this patent is extended or adjusted under 35 U.S.C. 154(b) by 21 days.

This patent is subject to a terminal disclaimer.

(21) Appl. No.: 11/212,549

(22) Filed: Aug. 27, 2005

(65) Prior Publication Data

US 2006/0000874 A1  Jan. 5, 2006

Related U.S. Application Data

(63) Continuation of application No. 10/714,193, filed on Nov. 13, 2003, now Pat. No. 6,986,453.

(51) Int. Cl.
*B23K 31/02* (2006.01)
(52) U.S. Cl. ............... 228/122.1; 228/124.1; 228/124.6; 228/234.1
(58) Field of Classification Search ............ None
See application file for complete search history.

(56) References Cited

U.S. PATENT DOCUMENTS

| | | | |
|---|---|---|---|
| 2,776,472 A * | 1/1957 | Mesick | 228/124.6 |
| 3,994,430 A * | 11/1976 | Cusano et al. | 228/122.1 |
| 4,854,495 A | 8/1989 | Yamamoto et al. | |
| 4,991,582 A | 2/1991 | Byers et al. | |
| 5,372,298 A * | 12/1994 | Glaeser | 228/195 |
| 6,221,513 B1 * | 4/2001 | Lasater | 428/629 |
| 6,521,350 B2 * | 2/2003 | Fey et al. | 428/472 |
| 6,616,032 B1 * | 9/2003 | Gasse et al. | 228/248.1 |
| 6,918,530 B2 * | 7/2005 | Shinkai et al. | 228/122.1 |
| 6,986,453 B2 * | 1/2006 | Jiang et al. | 228/122.1 |
| 6,989,200 B2 * | 1/2006 | Byers et al. | 428/621 |
| 2003/0141345 A1 | 7/2003 | Shinkai et al. | |
| 2005/0277989 A1 * | 12/2005 | Schnittgrund | 607/2 |

* cited by examiner

*Primary Examiner*—Kevin P. Kerns
(74) *Attorney, Agent, or Firm*—Gary D. Schnittgrund

(57) ABSTRACT

A method of bonding a ceramic part to a metal part by heating a component assembly including the metal part, the ceramic part, and a thin essentially pure interlayer material placed between the two parts heated at a temperature that is greater than the temperature of the eutectic formed between the metal part and the interlayer material, but that is less than the melting point of the interlayer material, the ceramic part or the metal part is disclosed. The component assembly is held in intimate contact at temperature in a non-reactive atmosphere for a sufficient time to develop a hermetic and strong bond between the ceramic part and the metal part. The bonded assembly is optionally treated with acid to remove any residual free nickel and nickel salts to assure a biocompatible assembly for implantation in living tissue.

17 Claims, 2 Drawing Sheets

MANUFACTURING METHOD FOR A CERAMIC TO METAL SEAL

CROSS REFERENCE TO RELATED APPLICATIONS

This application is a continuation of U.S. patent application Ser. No. 10/714,193, now U.S. Pat. No. 6,986,453. This application is related to commonly assigned U.S. patent application Ser. No. 09/972,280, now U.S. Pat. No. 6,521,350.

FIELD OF THE INVENTION

This invention relates to a method of producing a hermetically sealed ceramic to metal bond for implantation in living tissue.

BACKGROUND OF THE INVENTION

Known methods of bonding a ceramic to a metal involve the use of interlayer materials which either melt at the bonding temperature, such as a braze, or which involve special coating processes for the material surfaces to be bonded, such as pre-coating the surfaces with an activating material. In some methods of bonding, an interlayer material having a composition that approximates the composition of the initial metal bonding surface is utilized, such as disclosed by Lasater (U.S. Pat. No. 6,221,513 B1). Lasater describes a method for forming a hermetically sealed bond for use in implantable medical devices. Hill (U.S. Pat. No. 3,594,895) described another approach to forming a ceramic to metal seal.

Cusano (U.S. Pat. No. 3,994,430) disclosed a method of directly bonding metal to ceramic substrates wherein a very thin layer of an interlayer material is placed between the metal and the ceramic to be bonded. The system is heated in an inert atmosphere to a temperature between the eutectic temperature of the interlayer material and the melting point of the metal. Cusano focused on bonding copper to a ceramic substrate, such as alumina or beryllia.

DETAILED DESCRIPTION OF THE PREFERRED EMBODIMENT

Figure 1:
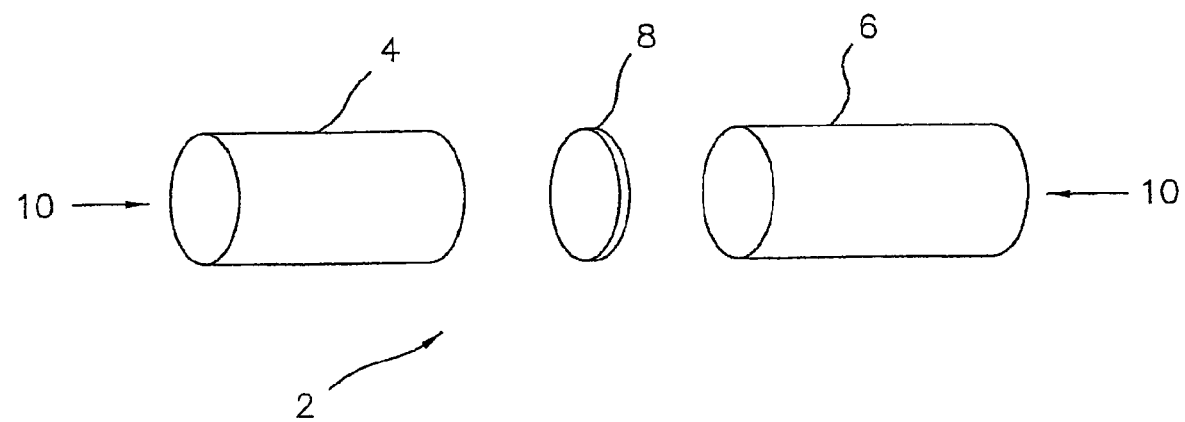
FIG. 1 illustrates the side view of the component assembly with the interlayer material as a foil between the ceramic and metal parts.

FIG. 1 shows component assembly 2 having metal part 4, ceramic part 6, and interlayer material 8. Component assembly 2 is heated to a specific process temperature, that is below the melting point of metal part 4, for a specific period of time, at a pressure that is created by force 10 and that is exerted so as to place interlayer material 8 in intimate contact with the metal and ceramic parts.

Interlayer material 8 is a foil having a thickness of less than about two-thousandth of an inch. Interlayer material 8 also is selected from the group of materials that are compatible with the metal chosen for metal part 4. Interlayer material 8 forms a bond with a metal part 4 by virtue of developing a eutectic or close-eutectic alloy at the bonding temperature and pressure utilized during processing. The eutectic alloy formed during processing is composed of the metals selected for metal part 4 and the interlayer material 8. The eutectic alloy formed wets the surface during the bonding process and enters into a diffusion and chemical reaction process with the ceramic part 6 thereby creating a strong bond joint during processing. The group of interlayer materials includes essentially pure nickel, i.e., pure nickel and nickel containing approximately two percent or less by weight of alloy metals. In a preferred embodiment, interlayer material 8 is commercially pure nickel foil having at least 99.0% nickel and less than 1.0% of other elements with a thickness of approximately 0.0007 inches.

Metal part 4 may be a biocompatible material such as a titanium alloy, and is Ti-6Al-4V in a preferred embodiment. Ceramic part 6 may be alumina, titania, zirconia, stabilized-zirconia, partially-stabilized zirconia, tetragonal zirconia, magnesia-stabilized zirconia, ceria-stabilized zirconia, yttria-stabilized zirconia, and calcia-stabilized zirconia, and in a preferred embodiment ceramic part 6 is yttria-stabilized zirconia. In alternative embodiments, rather than using interlayer material 8 as a foil, interlayer material 8 may be a thin coating that is applied to either the metal part 4 or ceramic part 6 surface to be bonded by any of a variety of chemical processes such as electroless plating and electroplating, or by any of a variety of thermal processes such as sputtering, evaporating, or ion beam enhanced deposition. Interlayer material 8 may also be applied as a thin coating of metallic beads or metallic powder.

Figure 2:
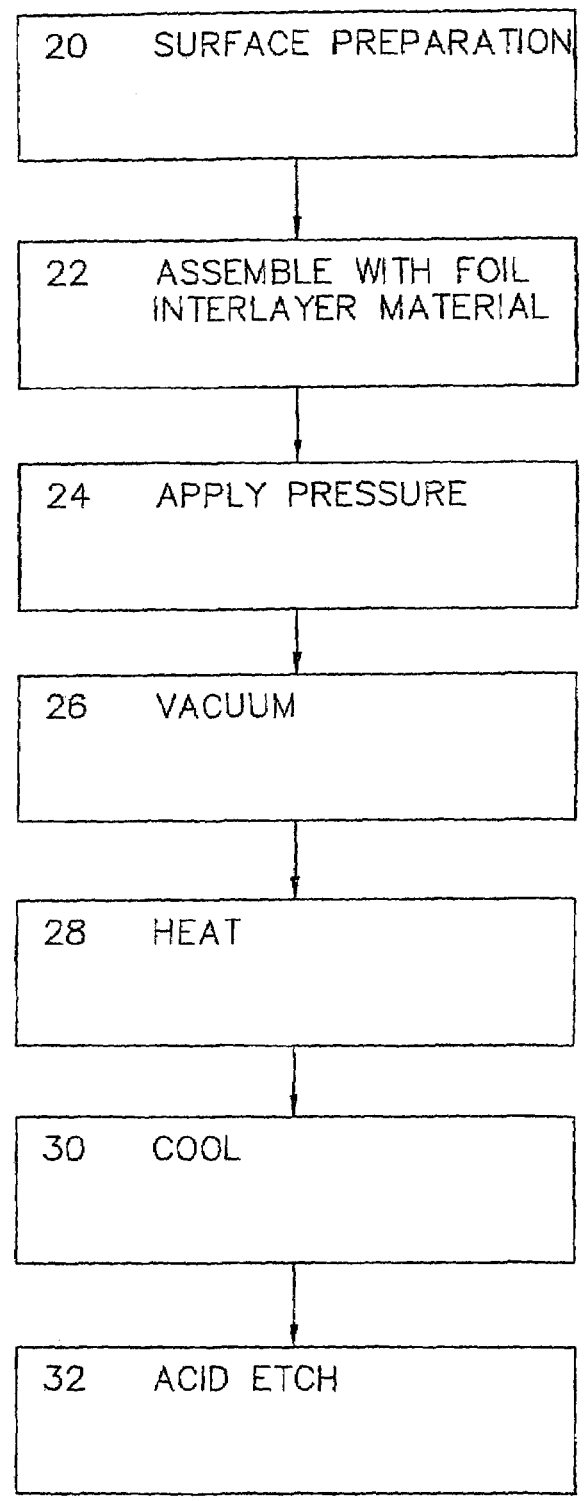
FIG. 2 schematically depicts the bonding steps of the present invention.

The process steps that are employed to create assembly 2 with a strong bond between metal part 4 and ceramic part 6 are schematically represented in FIG. 2. First, the surfaces to be bonded are prepared in step 20 by machining to assure that they will intimately conform to each other during bonding. The surfaces are smoothed and cleaned.

In step 22, component assembly 2 is prepared with interlayer material 8 between metal part 4 and ceramic part 6. In step 24, force 10 is applied to compress interlayer material 8 between metal part 4 and ceramic part 6. Force 10 is sufficient to create intimate contact between the parts. Force 10 is applied to assure that a homogeneous bond is formed between metal part 4 and ceramic part 6 thus creating a hermetic seal between the two parts.

In step 26 the assembly to be heat processed is placed in a furnace in a non-reactive atmosphere, which is preferably vacuum, but which can be argon in an alternative embodiment. A vacuum is applied before the furnace is heated to the processing temperature in step 28. A preliminary holding temperature may be used to allow the thermal mass of the parts to achieve equilibrium before proceeding with heating. The process temperature is lower than the melting point of metal part 4, but greater than the temperature of the eutectic formed between metal 4 and interlayer material 8. In a preferred embodiment, the vacuum is $10^{-6}$ to $10^{-7}$ torr, to assure that the interlayer material 8 and metal part 4 do not oxidize. Component assembly 2 is held at the selected temperature, which is typically between approximately 1728° and 2012° F., for approximately 1 to 60 minutes, while force 10 continues to be exerted on interlayer material 8. The exact time, temperature and pressure are variable with each other so as to achieve a hermetic and strong bond of metal part 4 with ceramic part 6. For example, in a preferred embodiment, an yttria-stabilized zirconia part is bonded to a Ti-6Al-4V part in vacuum at $10^{-6}$ torr at approximately 1800° F. for 10 minutes with a pressure of approximately 5 to 20 psi on a commercially pure nickel foil of approximately 0.0007 inches thickness.

The furnace is cooled and component assembly 2 is cooled to room temperature in step 30. In optional step 32, component assembly 2 is cleaned by being placed in a bath, after thermal processing is complete, to assure removal of all nickel and nickel salts. This bath is preferably an acid bath that etches the exposed surfaces of component assembly 2.

In a preferred embodiment, the bath is nitric acid. Removal of nickel and nickel salts in the bath etch insures that component assembly 2 is biocompatible. Nickel and nickel salts are detrimental to living animal tissue. In the preferred embodiment, however, all of the nickel that is introduced as interlayer material 8 is combined with the titanium, aluminum and vanadium and is tied up to be unavailable as free nickel or as a nickel salt.

Component assembly 2 is biocompatible after bonding and processing. Metal part 4, ceramic part 6, and interlayer material 8 are selected so as to be compatible with the environment in a living body. Hence, metal part 4 is typically a titanium alloy and ceramic part 6 is typically zirconia.

In a preferred embodiment, component assembly 2 is either an electrical sensor or an electrical stimulator that is implanted in a human body, although it could equally well be implanted in any animal. It must survive long periods in the hostile environment of a living body, which is basically a warm saline solution. In a preferred embodiment, component assembly 2 is either a sensor or stimulator comprised of a hollow ceramic tube that contains various electronic components that is bonded to a metal electrode end. The component assembly must be watertight; hence, the bond is hermetic, resisting salt-water intrusion as well as growth of living tissue into the metal-to-ceramic bond joint.

Further, component assembly 2 does not corrode while implanted in the body.

The materials are chosen such that post-bonding they are not susceptible to corrosion either individually or in the as-bonded state. Component assembly 2 resists electrolytic corrosion as well as crevice corrosion, because of the materials selected for component assembly 2.

Obviously, many modifications and variations of the present invention are possible in light of the above teachings. It is therefore to be understood that, within the scope of the appended claims, the invention may be practiced otherwise than as specifically described.

What is claimed is:

1. A method of hermetically sealing a ceramic and metal component assembly for implantation in living tissue, comprising the steps of:
   selecting a ceramic part;
   selecting a metal part;
   selecting an interlayer material consisting of nickel and that is compatible with said ceramic part, said interlayer material being one which forms a eutectic alloy with said metal part, said eutectic alloy consisting of metals of said metal part and said interlayer material and having a eutectic melting point temperature that is lower than the respective melting points of said metal or of said pure interlayer material;
   positioning said interlayer material between said ceramic part and said metal part;
   applying a force to said ceramic part and said metal part to place said interlayer material in compression, thereby creating intimate contact between said ceramic part, said metal part and said interlayer material;
   placing the assembly in a non-reactive atmosphere;
   heating the assembly to a bonding temperature between said eutectic melting point and said melting point of said material;
   holding the assembly at said bonding temperature for a predetermined time to form a bond between said ceramic part and said metal part; and
   cooling the assembly.

2. The method of claim 1 wherein said force creates compression between 2 and 500 psi.

3. The method of claim 1 wherein said force creates compression between 2 and 7 psi.

4. The method of claim 1 wherein said ceramic part is selected from the group consisting of alumina, titania, zirconia, stabilized-zirconia, partially-stabilized zirconia, tetragonal zirconia, magnesia-stabilized zirconia, ceria-stabilized zirconia, yttria-stabilized zirconia, and calcia-stabilized zirconia.

5. The method of claim 1 wherein said metal part is selected from the group consisting of titanium and its alloys.

6. The method of claim 1 wherein said metal part is comprised of Ti-6Al-4V.

7. The method of claim 1 wherein said interlayer material is approximately 0.002 inches or less thick foil.

8. The method of claim 1 wherein said interlayer material is applied chemically.

9. The method of claim 1 wherein said interlayer material is applied thermally.

10. The method of claim 1 wherein said interlayer material is in the form of metallic beads.

11. The method of claim 1 wherein said interlayer material is in the form of metallic powder.

12. The method of claim 1 wherein said non-reactive atmosphere is a vacuum between approximately $10^{-6}$ to $10^{-7}$ torr.

13. The method of claim 1 wherein said bonding temperature is between approximately 1728° to 2012° F.

14. The method of claim 1 wherein said predetermined time is between approximately 5 and 60 minutes.

15. A method of hermetically sealing a ceramic and metal component assembly for implantation in living tissue, comprising the steps of:
   selecting a ceramic part;
   selecting a metal part;
   selecting an interlayer material consisting of nickel and that is compatible with said ceramic part, said interlayer material being one which forms a eutectic alloy with said metal part, said eutectic alloy consisting of metals of said metal part and said interlayer material and having a eutectic melting point temperature that is lower than the respective melting points of said metal or of said pure interlayer material;
   positioning said interlayer material between said ceramic part and said metal part;
   applying a force to said ceramic part and said metal part to place said interlayer material in compression, thereby creating intimate contact between said ceramic part, said metal part and said interlayer material;
   placing the assembly in a non-reactive atmosphere;
   heating the assembly to a bonding temperature between said eutectic melting point and said melting point of said metal;
   holding the assembly at said bonding temperature for a predetermined time to form a bond between said ceramic part and said metal part;
   cooling the assembly, and
   cleaning said component assembly after bonding to remove toxic materials that are harmful to living tissue.

16. The method of claim 15 additionally comprising the step of cleaning said component assembly after bonding by placing it in an acid bath.

17. The method of claim 15 wherein said toxic materials are nickel and nickel salts.

* * * * *